United States Patent
Havens et al.

(10) Patent No.: US 11,392,645 B2
(45) Date of Patent: Jul. 19, 2022

(54) COMPUTERIZED DOMAIN EXPERT

(71) Applicant: CarLabs, Inc., Calabasas, CA (US)

(72) Inventors: Samuel Akiba Havens, West Hills, CA (US); Martin Schmitt, Topanga, CA (US); Barack Brian Karavani, West Hills, CA (US)

(73) Assignee: CarLabs, Inc., Los Angeles, CA (US)

( * ) Notice: Subject to any disclaimer, the term of this patent is extended or adjusted under 35 U.S.C. 154(b) by 0 days.

(21) Appl. No.: 16/344,010

(22) PCT Filed: Oct. 23, 2017

(86) PCT No.: PCT/US2017/057936
§ 371 (c)(1),
(2) Date: Apr. 22, 2019

(87) PCT Pub. No.: WO2018/081020
PCT Pub. Date: May 3, 2018

(65) Prior Publication Data
US 2019/0340201 A1    Nov. 7, 2019

Related U.S. Application Data

(60) Provisional application No. 62/412,169, filed on Oct. 24, 2016.

(51) Int. Cl.
*G06F 16/9032* (2019.01)
*G06F 16/9535* (2019.01)
(Continued)

(52) U.S. Cl.
CPC .... *G06F 16/90332* (2019.01); *G06F 16/9535* (2019.01); *G06F 40/30* (2020.01); *G06N 20/00* (2019.01); *H04L 51/02* (2013.01)

(58) Field of Classification Search
CPC .......... G06N 20/00; G06N 3/006; G06N 3/02; G06N 3/0427; G06N 5/022; G06F 16/248;
(Continued)

(56) References Cited

U.S. PATENT DOCUMENTS 7,249,117 B2 *  7/2007  Estes ................. G06Q 50/22
                                                              706/52
7,814,048 B2    10/2010  Zhou et al.
(Continued)

FOREIGN PATENT DOCUMENTS

KR         101153108 B1      6/2012

OTHER PUBLICATIONS

Noh et al., IEEE Journal of Selected Topics in Signal Processing, vol. 6, No. 8, Dec. 2012, pp. 943-958 (Year: 2012).*
(Continued)

*Primary Examiner* — Cheyne D Ly
(74) *Attorney, Agent, or Firm* — Appleton Luff

(57) ABSTRACT

A computer system permits flexible, natural conversational type interactions. A natural language processing module receives natural conversational type interactions from a user and generates structured data from unstructured inputs regarding user queries within a domain. A data stack comprises a database with configurable comparison and evaluation logic for importing, transforming, normalizing, and exporting data pertaining to the domain. A dialogue authoring module includes control logic for permitting creation of complex dialogues. The dialogues are generated from recipes that characterize aspects of a product within the domain. A core module receives the structured data created by the natural language processing module and causes output to the user in the form of natural language type responses by way
(Continued)

of one or more templates. An analytics and reporting module provides analysis of usage of the system.

19 Claims, 14 Drawing Sheets

(51) Int. Cl.
*G06F 40/30* (2020.01)
*G06N 20/00* (2019.01)
*H04L 51/02* (2022.01)

(58) Field of Classification Search
CPC .... G06F 40/20; G06F 40/56; G06F 16/90332; G06F 40/30; G06F 40/186; G06F 40/232; G06F 16/9535; G06F 40/35; H04L 51/02
See application file for complete search history.

(56) References Cited

U.S. PATENT DOCUMENTS

| | | | |
|---|---|---|---|
| 7,962,578 B2 * | 6/2011 | Makar | G06F 9/44 709/219 |
| 8,285,654 B2 | 10/2012 | Bajrach | |
| 8,630,961 B2 * | 1/2014 | Beilby | G06N 3/004 706/11 |
| 8,762,316 B2 * | 6/2014 | Jerram | G06N 5/02 705/14.54 |
| 8,818,926 B2 | 8/2014 | Wallace | |
| 8,949,377 B2 * | 2/2015 | Makar | G06Q 30/02 709/219 |
| 9,141,708 B2 | 9/2015 | Hungar et al. | |
| 9,213,687 B2 * | 12/2015 | Au | G06F 40/253 |
| 10,789,534 B2 * | 9/2020 | Hosn | G06F 40/35 |
| 2002/0087310 A1 * | 7/2002 | Lee | G10L 15/183 704/251 |
| 2009/0292778 A1 * | 11/2009 | Makar | G06F 16/00 345/619 |
| 2014/0122407 A1 | 5/2014 | Duan | |
| 2015/0032615 A1 | 1/2015 | Blackhurst et al. | |
| 2017/0206897 A1 | 7/2017 | Jiang et al. | |

OTHER PUBLICATIONS

International Preliminary Report on Patentability for PCT/US2017/057936.
Vasallo et al., Phase Coherence In Conceptual Spaces for Conversational Agents, Semantic Computing, ed. Sheu, Yu, Ramamoorthy, Joshi, and Zadeh. Copyright 2010, The Institute of Electrical and Electronics Engineers, Inc. pp. 357-371.
(Rahmawati, N et al.) Conversational Recommender System with Explanation Facility Using Semantic Reasoning. International Journal on ICT, vol. 1, Issue 1. Jun. 2016; abstract; pp. 1, 3-4, 7-8, 10.
(The Banks Report) CarLabs Brings Artificial Intelligence to Automotive, Sep. 18, 2016; [Retrieved from the Internet on Nov. 28, 2017]; ; title; pp. 2-4.
An Intelligent Chat-bot using Natural Language Processing; R. S. Siddhantlahoti, K. Lavanya; International Journal of Engineering Research, vol. No. 6, Issue No. 5, pp. 281-286.
Survey on Chatbot Design Techniques in SpeechConversation Systems; S. Abdul-Kader, J. Woods; Int'l Journal of Advanced Computer Science and Applications, vol. 6, No. 7 (2015).
International Search Report, PC/US2017/057936.
Written Opinion of the International Searching Authority, PC/US2017/057936.

* cited by examiner

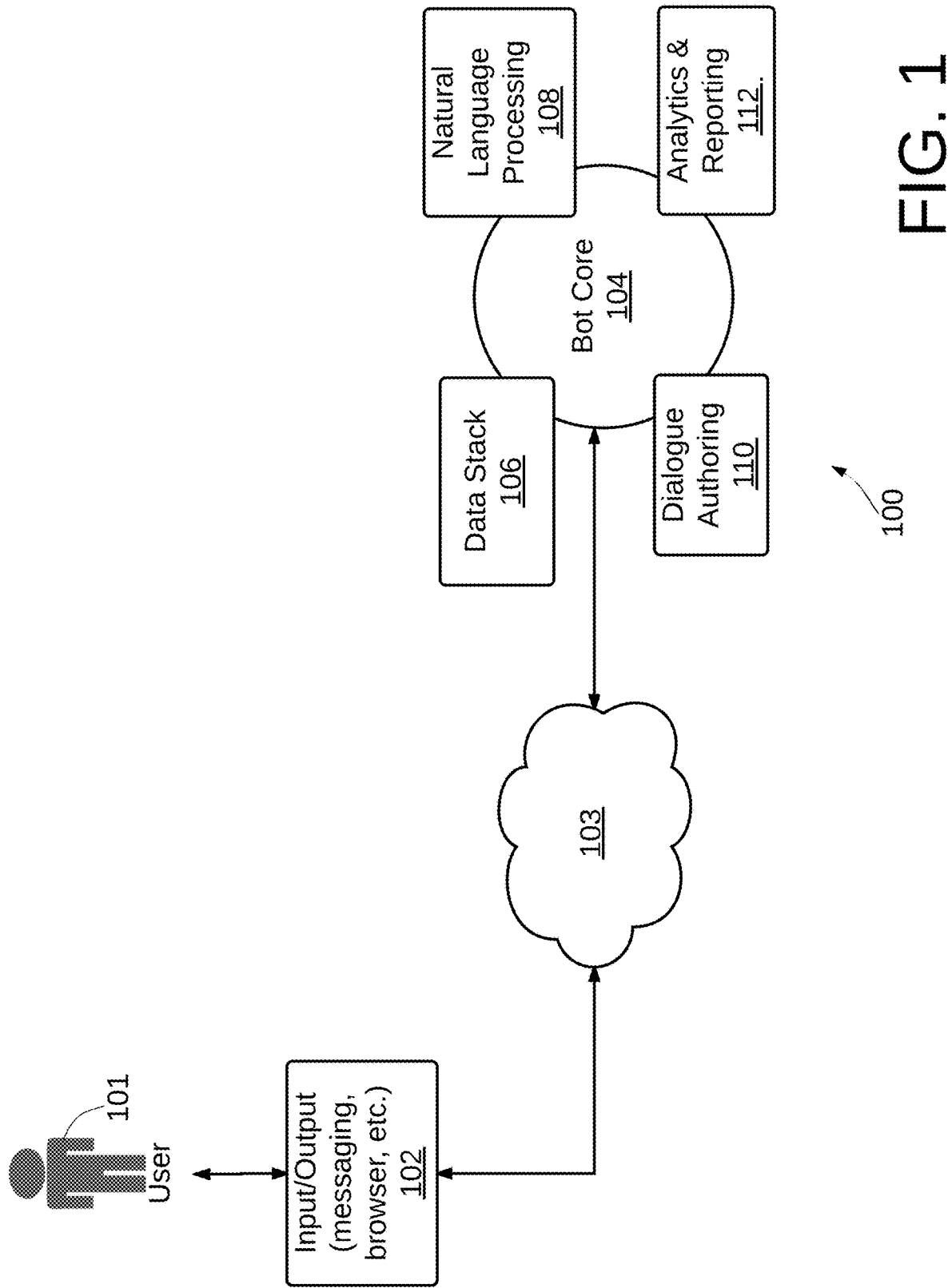

COMPUTERIZED DOMAIN EXPERT

CROSS-REFERENCE TO RELATED APPLICATIONS

This application claims priority to PCT Application No. PCT/US2017/057936 filed on Oct. 23, 2017, which claims priority to U.S Application 62/412,169 filed on Oct. 24, 2016.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to the field of data processing systems and more particularly to such systems that permit flexible, natural conversational type interaction.

BACKGROUND

Natural language processing systems, sometimes known as chatbots, permit conversational style interaction with computer systems. Such systems tend to be good at effectful, imperative commands ("retrieve this information for me", "perform this action", "store this information"). They do not do well in other cases. For example, Hipmunk produces a chatbot on the Messenger platform available from Facebook. It can search for flights, sort them, filter them, and suggest destinations. There are many factors it cannot address, such as weather preferences, languages spoken at destination, concepts such as "romantic" or "to have a fling" or "to develop myself spiritually." Digit, a popular conversational interface to one's bank account, can perform rudimentary functions such as display balances and recent transactions as well as transfer money to or from a savings account. There is accordingly a need for a computer system that provides an improved, flexible, natural conversational type interaction.

SUMMARY

Computer systems that permit flexible, natural conversational type interaction are disclosed herein. By employing an artificial intelligence engine and a robust data store, such systems permit creation of complex conversations algorithmically. The result is direct answers to natural language questions. For example, in the car shopping domain, the question "What is the most fuel efficient SUV under $35,000?" may be posed. This is in contrast to the iterative querying that must be performed otherwise. The disclosed systems operate in conjunction with well known messaging or voice platforms such as Facebook Messenger, SMS, Web, Amazon Alexa, or Google Home. The disclosed systems provide flexible dialog authoring tools that provide a system administrator with full control over the bot's behavior. In addition, the disclosed system provides analytics that provide full insight into the system performance. The disclosed system permits creation of intelligent conversational agents that can scale easily within a particular domain by employing templates that are automatically filled, thereby eliminating painstaking, manual coding.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 1 is a high-level block diagram of components of a computer system that permits flexible, natural conversational type interaction.

DETAILED DESCRIPTION

Figure 2A:
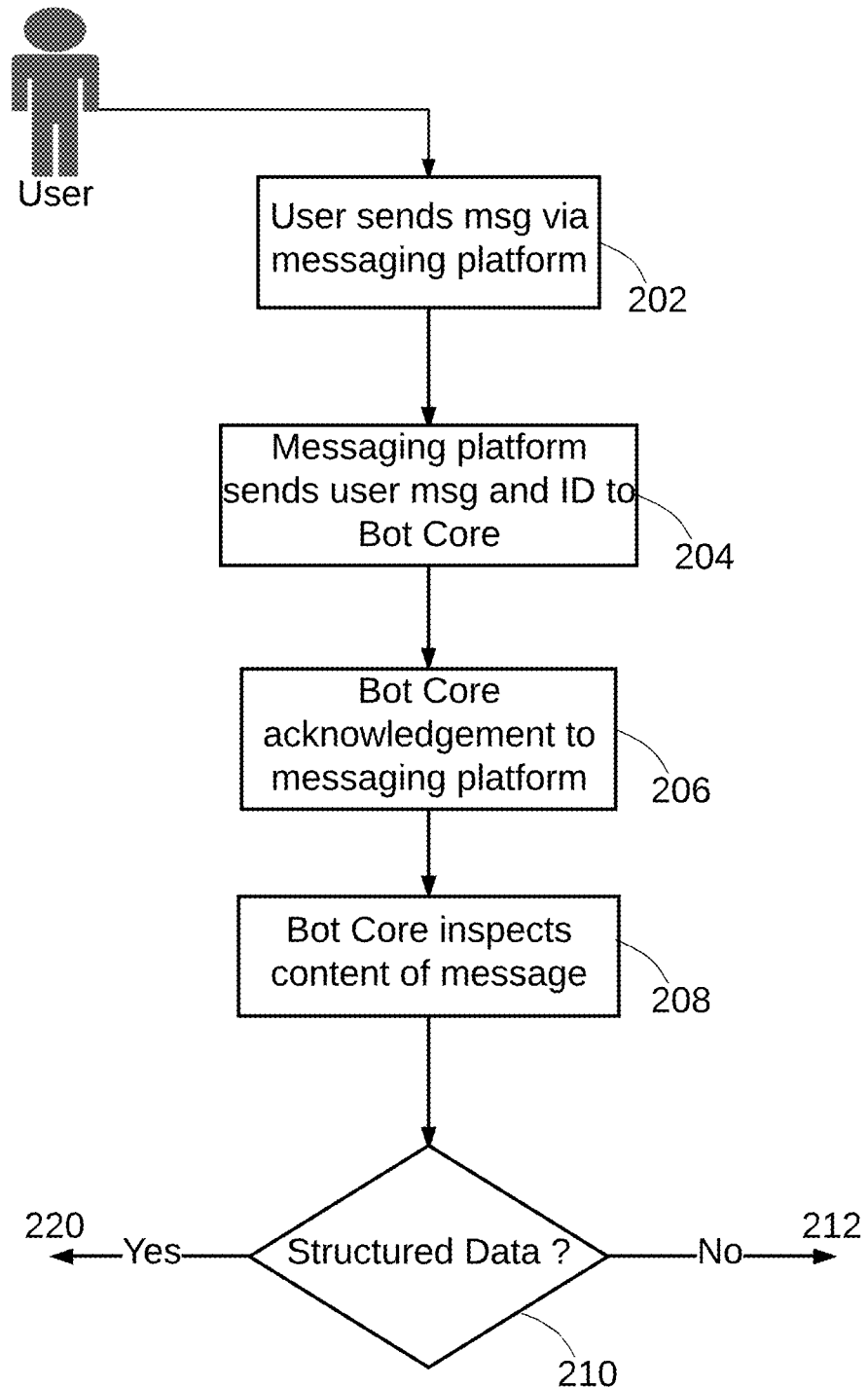
FIGS. 2A, 2B and 2C are flow diagrams illustrating high-level operation of the system of FIG. 1.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Making an informed decision requires being informed about that domain. With respect to decision making regarding products, the resources and effort required to become informed grow as products become more complicated. An individual attempting to act rationally is confronted with a problem: the value of becoming informed sufficiently to make a rational decision is of uncertain value, and so the individual defaults to intuition, recommendations of friends or experts, or other heuristics. These heuristics are better than chance, but not necessarily optimal. Expert reviews are potentially useful, but do not address all possible permutations of user preferences.

Ideally, there would be unrestricted access to a domain expert who is capable of understanding an individual's preferences and criteria (at whatever level of abstraction the individual is capable of communicating), and who took those into account when comparing all options available to the individual. This domain expert would weigh all known factors in the decision space with weightings corresponding to the user's stated preferences, and come up with recommendations with textual and graphical justifications. Unfortunately, this has been in the past merely a theoretical construct instead off reality. Having a domain expert with the aforementioned criteria that is available and who can understand an individual's preferences and criteria at whatever level of abstraction the individual is capable of communicating has been a goal instead of a reality.

Moreover, products, such as cars, often become more complex over time. Even someone who was a domain expert a decade ago may find themselves at a loss to evaluate a car using the framework of a modern buyer, who values telematics, connectivity, and machine-learning-based safety features. An average car-buyer may not be able to even express their preferences as above, instead only articulating that they want "the best safety features for the money" and "something that works well with their phone."

Currently, an individual who requires decision support can read editorials, technical documentation, user reviews, or a combination of the above. Most likely, they would search for these materials using a web search engine such as Google or Bing. However, web search engines currently only find relevant documents; they do not generate a new document given the unique preferences of a user. In a sense, the process described herein can be seen as creating a domain-specific search engine which makes value judgements. It can be seen as a search engine which generates micro-documents (which may contain any form of retrieved or generated media), and it is stateful. Currently, web searches are history-dependent, but are not context-aware enough to replace pronouns ("it") with the most-likely subject. This statefulness ends up being a defining factor, as it allows for the process to feel conversational. It also provides value if the problem domain involves time, as it allows for memory.

Systems and processes to create computerized domain experts are disclosed. More specifically, methods and systems are disclosed for creating a domain-specific, retrieval-based chatbot capable of decision support through awareness of emergent features by generation of large corpora of text via templates created from curated "recipes". The disclosed methods and systems may take the form of "chatbots", a combination graphical/conversational user interface to an API (application program interface) which accesses some system with data (in the interesting cases which we consider here, the data is self-referential, and contains information on both entities and relationships between those entities). This disclosure describes both the creation of the user interface and the generation of the system with self-referential data.

The system utilizes a data store formed of structured and unstructured data. The structured data stores measurable aspects of information within a domain. For example, if the domain is cars, the structured data will store a comprehensive set of the quantifiable features of cars. Aspects of a domain that do not lend themselves to being quantified, such as subjective aspects, are stored as unstructured data, such as in text form. For example, in the car domain example, ride quality is a subjective feature that does not lend itself to being quantified. In some embodiments, the structured data can be generated by extraction from unstructured data via a variety of techniques.

The system advantageously builds trust among consumers by supporting consumer decision making, answering their questions and offering proactive advice. The system interacts with consumers by conversing in consumer type language by translating abstract data into useful information to enable comparisons and promote additional conversation which ultimately lead to decisions by the consumer.

The system advantageously supports querying for explanations. For example, the following questions in the automobile example: "Why is the XC90 the safest SUV under $60,000?", or "Why is the Accord 'better for me' than the Sonata?", or "Why is the Corvette the best performance car for the money?" The score generation process creates a narrative of factors, weights, outliers and comparisons. Scores are weighted according to a current user model which stores preferences for vehicle attributes. The system also permits personalization, such as by employing variable user preferences which allow personalized weighting ("Max Pts. Available") in product comparisons.

FIG. 1 is a high-level block diagram of components of a computer system that permits flexible, natural conversational type interaction. Computer system 100 provides flexible natural conversational type interaction with user 101 via messaging platform 102. Communication between messaging platform 102 and computer system 100 may be over Internet 103 or other communication mechanisms.

Bot core 104 implements logic for the system 100 employing the services and data provided by modules 106, 108, 110 and 112. Data Stack 106 takes the form of a database with configurable comparison and evaluation logic. The Data Stack 106 imports, transforms, normalizes, exports, and exposes APIs. Preferably it also has tools for augmenting data manually (filling holes, correcting errors). Natural Language Processing (NLP) module 108 provides language processing for automating interactions between the system and end users 101. NLP module 108 permits definition of aspects of natural language processing such as intents and entities. In certain embodiments, NLP module 108 may take the form of a commercially available NLP service such as, for example, DialogFlow.ai (formerly API.ai) from Dialogflow, Wit.ai from Facebook, Watson's Conversation Service (WCS) from IBM, or Language Understanding Intelligence Service (LUIS) from Microsoft. Dialogue Authoring module 110 provides control logic that permits creation of creates complex dialogues, implemented by recipes as described herein, without programming. Analytics and Reporting 112 module analyzes usage of the system 100 for system administration purposes and also analyzes templates to provide optimal template and deck variations.

The natural language expert system allows domain experts to define an arbitrary vocabulary of terms. For example, in the auto industry the terms may include: Safety, Economy, Connectivity, Autonomy, Reliability, Performance, Roominess, Environmental, Responsibility, Utility, Comfort, Luxury, Kid-friendliness, Pet-friendliness, Hauling & Towing, Style, Fun-to-drive, Off-roading. Dependability.

Preferably, data structures known as recipes are employed to characterize aspects of the products to which the system is directed. Recipes are models which assign numeric utility values to the atomic constituent parts of elements of the problem-domain and accumulate those values to a top-level score. Recipes essentially describe desirability of a measurable attribute. For example, horsepower for performance in the domain for car. If the recipe is for power, then more is better so greater power is more desirable. The recipe for horsepower will provide information indicative of which car has "good" horsepower, as opposed to merely identifying how much horsepower a car has. If the recipe is for safety then the value of horsepower, i.e., its desirability, within the safety recipe will increase to a certain point and then decrease because too much power can adversely impact safety. If the recipe is luxury, then the price will tend to rise in desirability whereas if the recipe is for economy then the desirability of price will tend to increase with decreasing price. Recipes preferably have a networked structure, which may be tree-like, and are themselves accumulated to present a final, justifiable overall score.

Figure 2B:
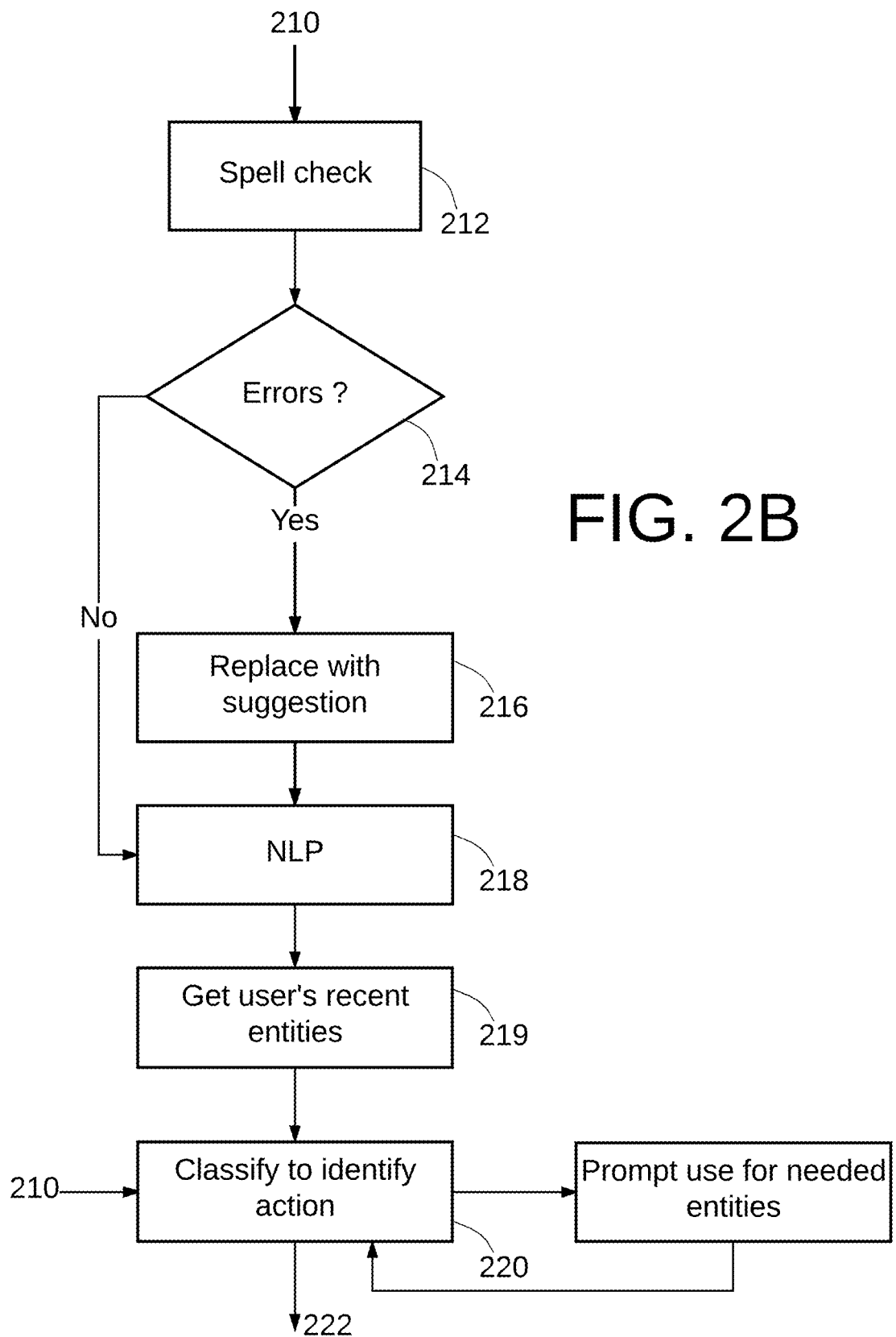
Figure 2C:
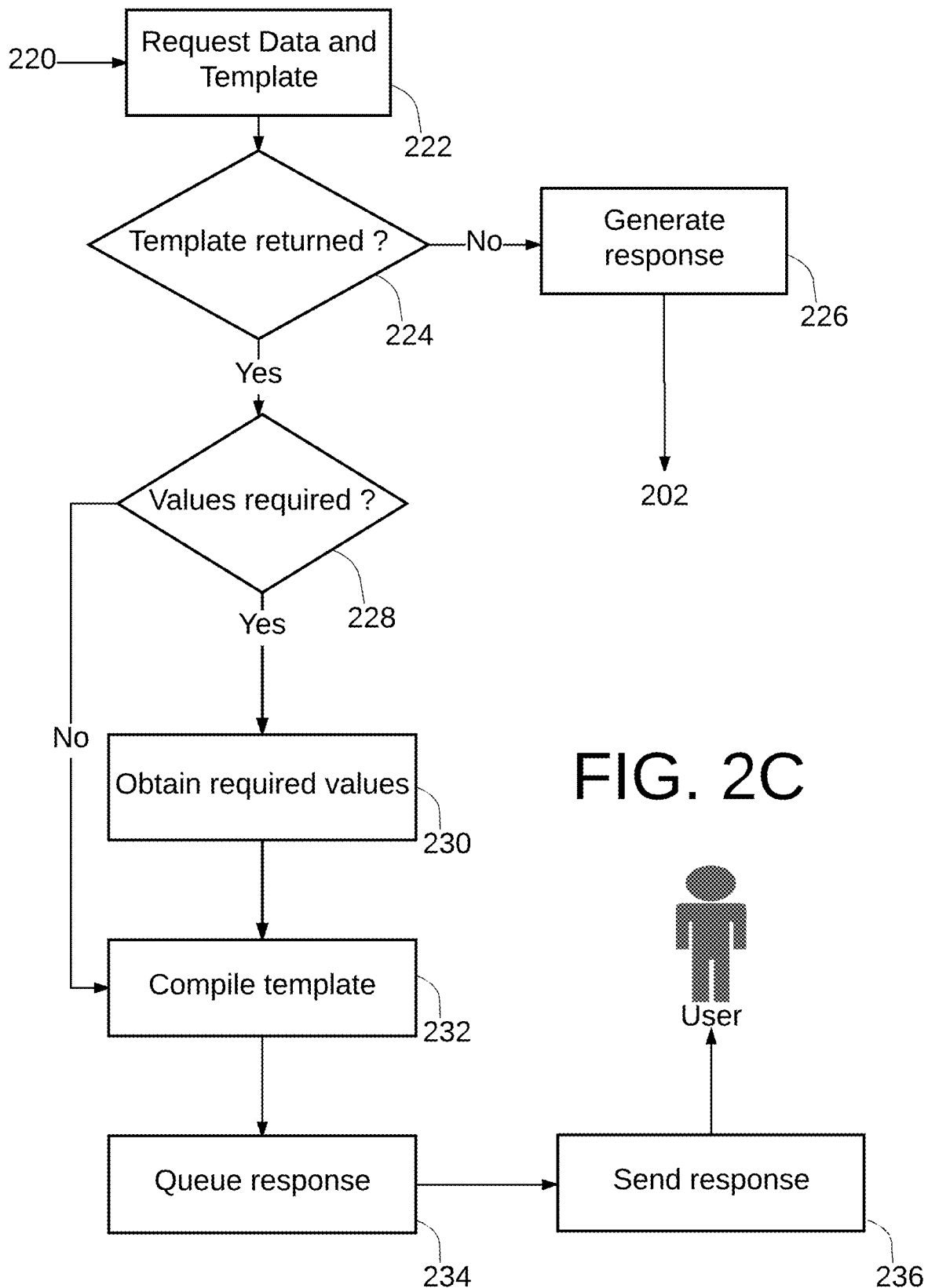

FIGS. 2A, 2B and 2C are flow diagrams illustrating high-level operation of the system of FIG. 1. The actions shown in FIGS. 2A, 2B and 2C are shown in sequence for simplicity of explanation but in certain embodiments, certain actions may be performed concurrently. The steps shown in FIGS. 2A, 2B and 2C are preferably coordinated and controlled by Bot Core 104 which calls upon data, services and functions provided by the modules 106, 108, 110 and 112. As seen in FIG. 2A, user 101 sends a message using messaging platform 102 which may take a conventional form such as a browser, a messaging application such as offered by Facebook Messenger, or a voice assistant such as Google Home or Amazon Alexa. At 204, the messaging platform 102 receives the message and sends the user message and an identification (ID) that identifies the user 101 to Bot Core 104. The message sent to the Bot Core 104 may be in text for similar form. At 206, the Bot Core 104 acknowledges receipt of the message and at 208 inspects the content of the message. If the message content contains unstructured data, steps 212, 214, 216 and 218 are performed for the Bot Core 104 to understand the content of the message. If the message content contains structured data flow jumps to step 220. An example of an unstructured message is one that is provided as a sentence or question, such as for example, if the user is querying about automobiles, "is the sorrento safe?" A spell check is performed at 212 to correct any errors in the message. If one or more error(s) are detected, they are preferably replaced with a suggestion (216). In certain embodiments, if the spell check returns multiple suggestions, the most highly ranked suggestion is used to replace out the identified misspelled word with the suggestion. If the spell check does not identify errors, no mutation is made.

NLP module 108 is employed at 218 to generate structured data from unstructured, conversational style input. After 218, or if the message content contains structured data such as for example a query in a format natively supported by the system 100 then step 220 is performed to classify the input into a predefined category. An example of a structured query may be: {"userResponse": {"action": "user.happy"}}. The classification is typically referred to as an intent. Sometimes one more entities are also returned by the NLP module 108. An entity is predefined words or groups of words. When defined, entities have a canonical representation and synonyms. The canonical representation is always returned, even if the text contained a synonym. Continuing with the automobile example, for the example if the text provided to the NLP module 108 is "is the sorrento safe", the response will contain: Intent=request.attribute; entities={"car": {"model": "sorento" }, "attribute": "safety"}

Turning to FIG. 2C, the Bot Core 104 at 222 employs the intent and if received, the entity returned at 220, to identify an appropriate handler (also called a reducer), capable of handling the specified intent for the identified intent is executed. A user state, which is a collection of structured data representing salient details from the conversation with the user 101, as well as entities, are used by the reducer to appropriately classify the intent into a sub-category called an Action. In other words, for any intent, there is at least one Action. The reducer sends a request for data that is stored as being needed for that request. This is done ahead of time by an editor. In one embodiment, this is handled in code. In other embodiments, this may be implemented as part of the Dialogue Authoring module 110. Concurrently with step 220, at 222 the reducer sends a request to the Dialogue Authoring Module 110 requesting a template associated with the Action. At 224, if the module 110 has a template for that Action, it is returned. An Action is not guaranteed to have a template, or may have a blank template.

The data fetching performed by the module 110 is unique because, as part of the dialogue creation process, structured data is correlated with language. So, templates can be checked to make sure all values they refer to exist. Then, when at the same time a template is fetched, all needed data can be fetched as well, to guarantee the template compiles.

Figure 4A:
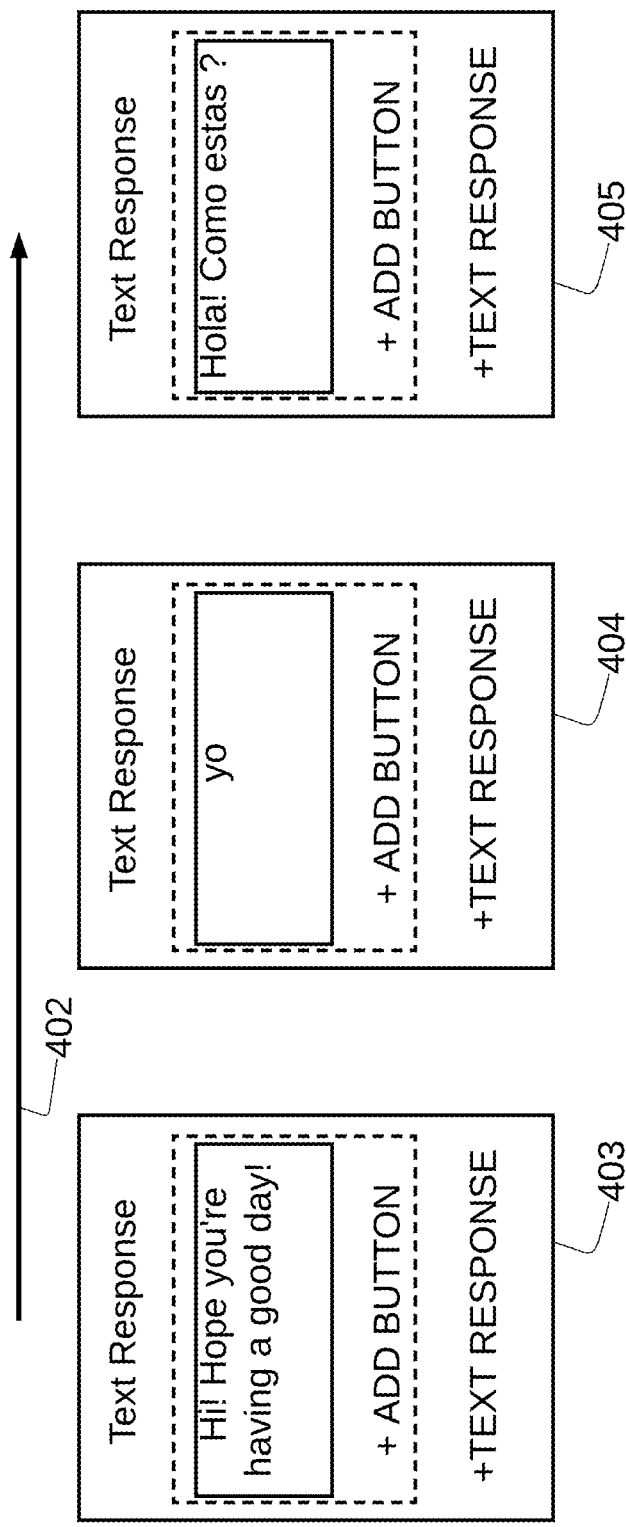
FIGS. 4A and 4B are illustrations of sample templates employed for user interaction.
Figure 4B:
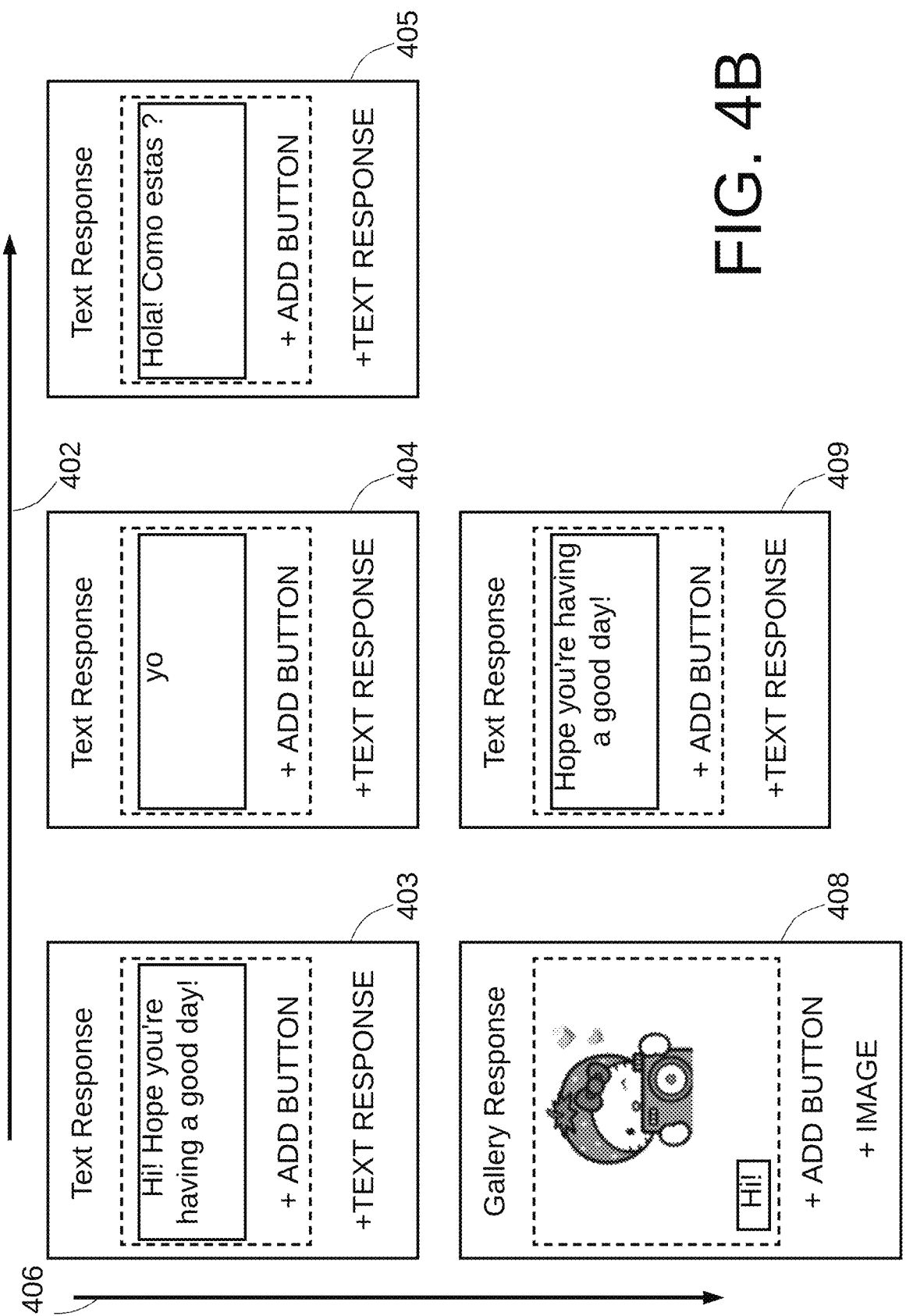
Figure 7:
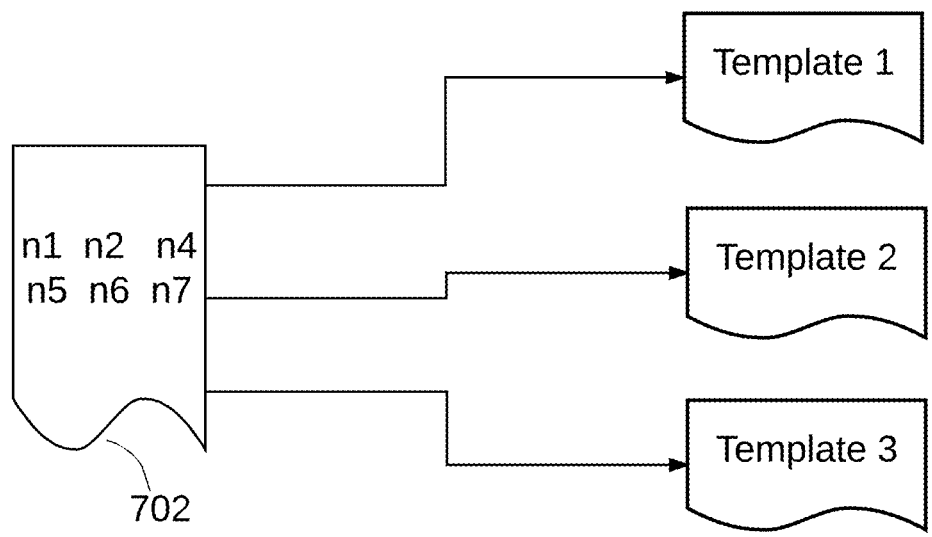
FIG. 7 is an illustration of mapping of templates to nodes in a recipe.

Templates operate to tell the system how to answer a user request for information and may be modeled after expert reviews. Templates also operate to determine how the system decides what it thinks a user cares about. Templates are tagged as being connected to at least one node in a recipe, as seen in FIG. 7, which shows a recipe 702 with six nodes (n1, n2, n4, n5, n6, n7). Template 1 may be connected to, for example n2, and n4. Template 2 may be connected to, for example, n1 and n2. Template 3 may be connected to, for example, n4, n5, n6 and n7. The tag(s) are for retrieval purposes. Templates, upon being filled in, produce output strings for the system—lines of dialogue for the chatbot. Further details of templates are shown in FIGS. 4A and 4B and the associated description. Template/node tags contain a magnitude, which represents the strength of the connection between that node and all other nodes which appear in the same template.

The template also contains a measure of the polarity and magnitude of its own output's sentiment. This is used for selecting appropriate templates for given recipe-node/problem-domain-element-part combination. That is, product (polarity, magnitude) is in the same range as the output of a normalized utility value assignment function, the NUR (normalized utility range). Applying the normalized utility value assignment function of a given recipe-node to its corresponding problem-domain-element-part outputs a value in the NUR. When generating the output corpus for a given problem-domain-element, we pick a template tagged with the problem-domain-element-part, whose product (polarity, magnitude) is closest to the return value of the matching recipe-node's normalized utility value assignment function applied to the problem-domain-element-part.

Figure 9:
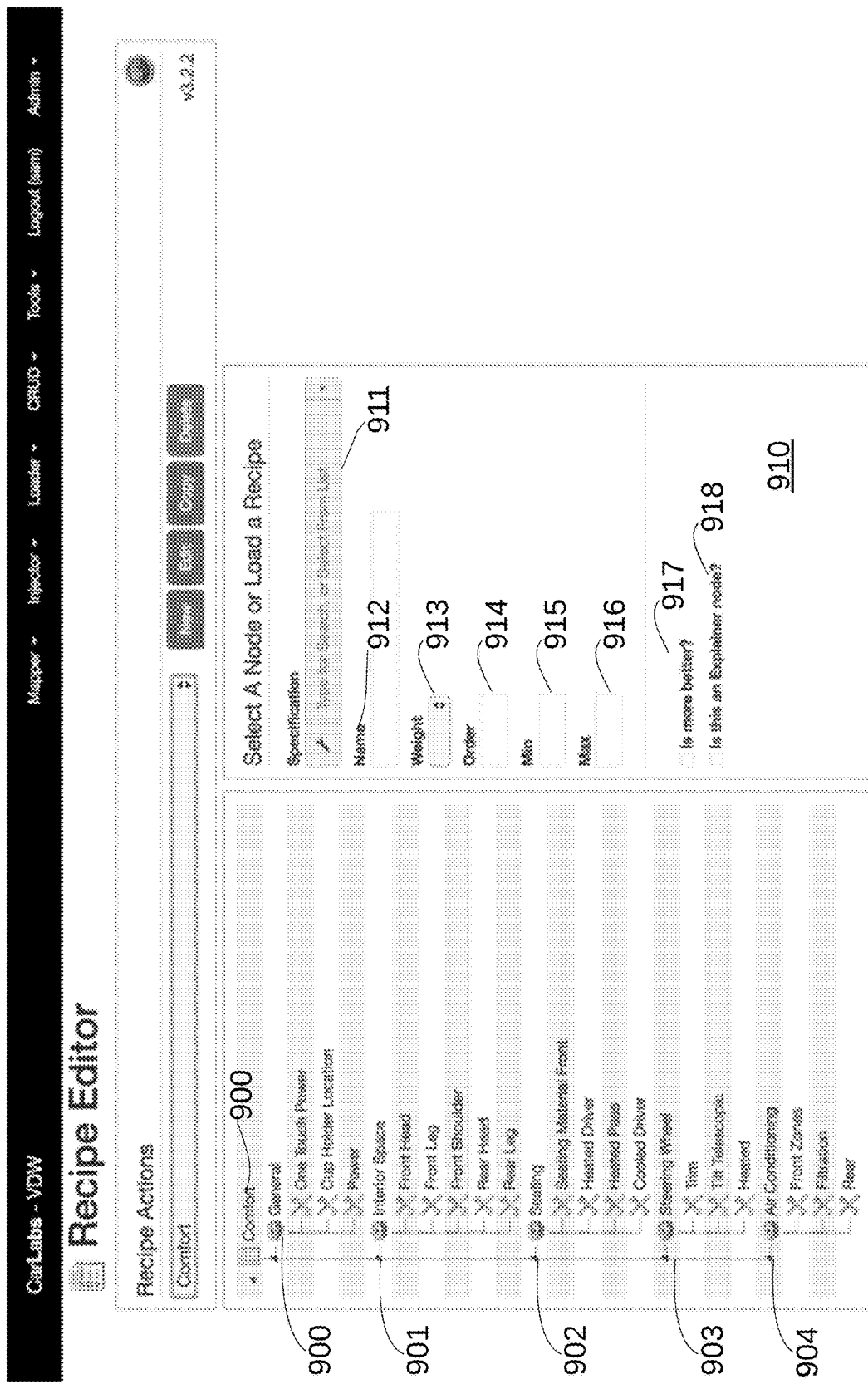
FIGS. 9 and 10 are screen shots showing a user interface for interacting with the system to create recipes.
Figure 10:
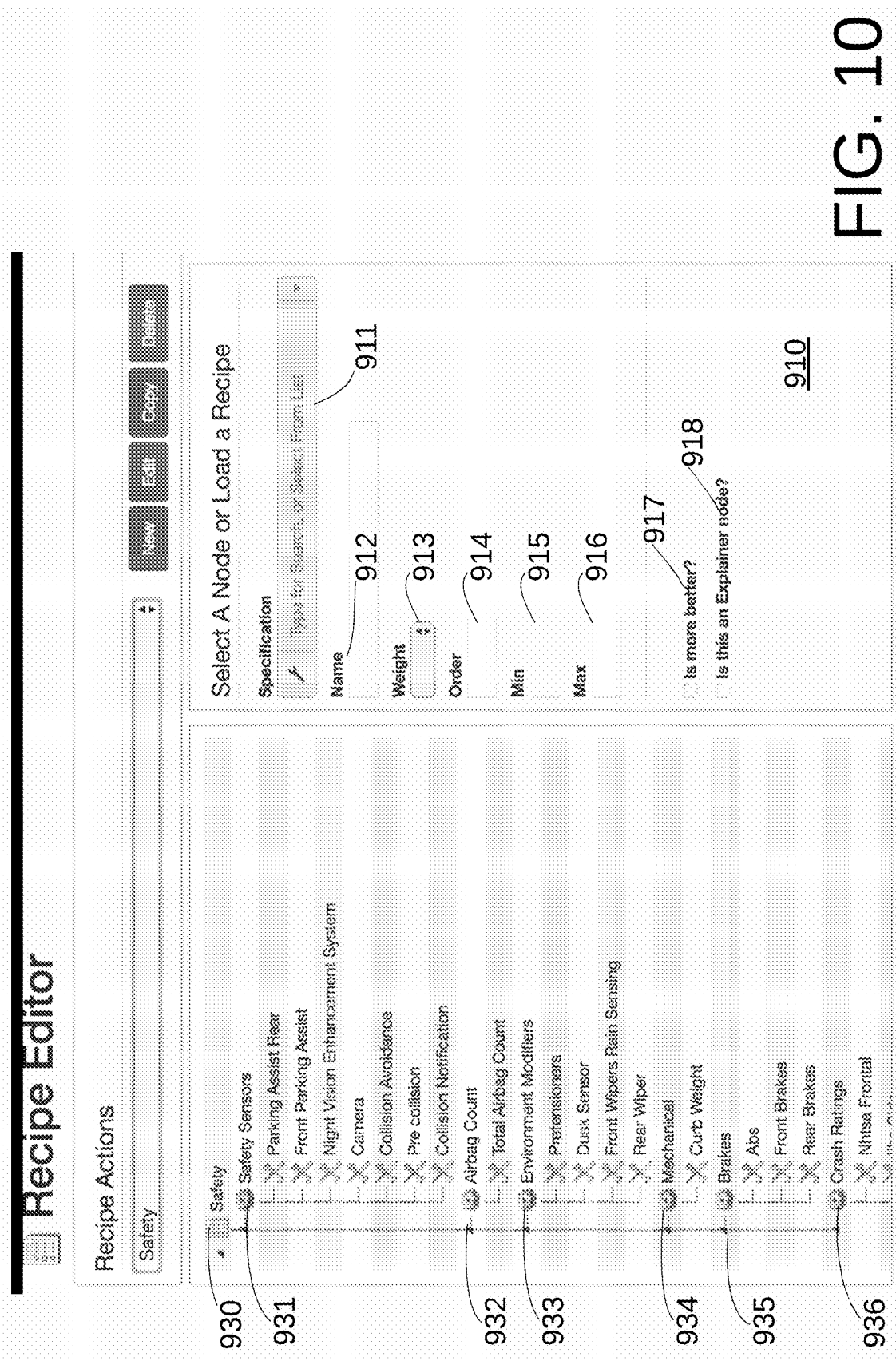

For example, if the problem domain is car selection, a recipe may be "performance", and a recipe-node may be "horsepower." A problem-domain-element would be a car. A problem-domain-element-part would be the horsepower of that car. The normalized utility value assignment function of the (performance, horsepower) recipe-node represents how the horsepower of a car is transformed to a score which can be compared to other car's (performance, horsepower)

recipe-node value. The responsibility of the normalized utility value assignment function is establishing the correlation between horsepower and value to the user, in the context of Performance. Further details of recipes are shown in FIGS. 9 and 10 and the associated description.

Template output need not be textual to have associated sentiment. A chart, for example, could have negative sentiment if it shows a problem-domain-element-part has a low NUV (relative to a recipe-node). When a match is found between user input and an instantiated template, the template's tags are used to increase the system's belief that the tagged attributes are factors in the user's decision, and the recipe-node tag, it's magnitude, and triggering input are stored as evidence of the belief.

Turning back to FIG. 2C, at 226, if a template is not returned, the user 101 is prompted to enter, via step 202, additional information to permit needed entities to be retrieved. At 228, the template returned may have values required to be filled in before sending to the user 101. For example, "well, {{user.name}}, I think the best car for you is the {{car.make}} {{car.model}}". At 230, if the template is missing values, the reducer provides those at 232 from the state of entities, this process of filling in the missing values is referred to as compiling the template. Once the template is compiled, at 234 the response is sent to a queue. In parallel, the user's state may be updated. The logic to do this is in the reducer. At 236, at every cycle, the queue is checked. If there are messages in the queue, they are sent to the appropriate user by id.

In the event that an Action does not have a template, or has a blank template, the reducer, with access to entities from the NLP service as well as the state of the user, generates a response with code. It does this by following encoded procedures which combine small templates. For example, the dialogue authoring tool 110 does not have a visual way of describing "If a Kia is compared to a non-Kia, and we want the Kia to look good: So, fetch the recipe for each car, and find nodes of the recipe where the Kia does better than the non Kia. Order these by weight of the node, then read back the top four values, preceded with this text:" So instead of being in the GUI, that is in code.

In certain embodiments, NLP training may be leveraged. There are other times to use machine learning such as for (i) Classifying cars to recommend similar cars; (ii) Mining structured data from user and expert reviews; or (iii) Recognizing features of cars with computer vision.

Figure 3A:
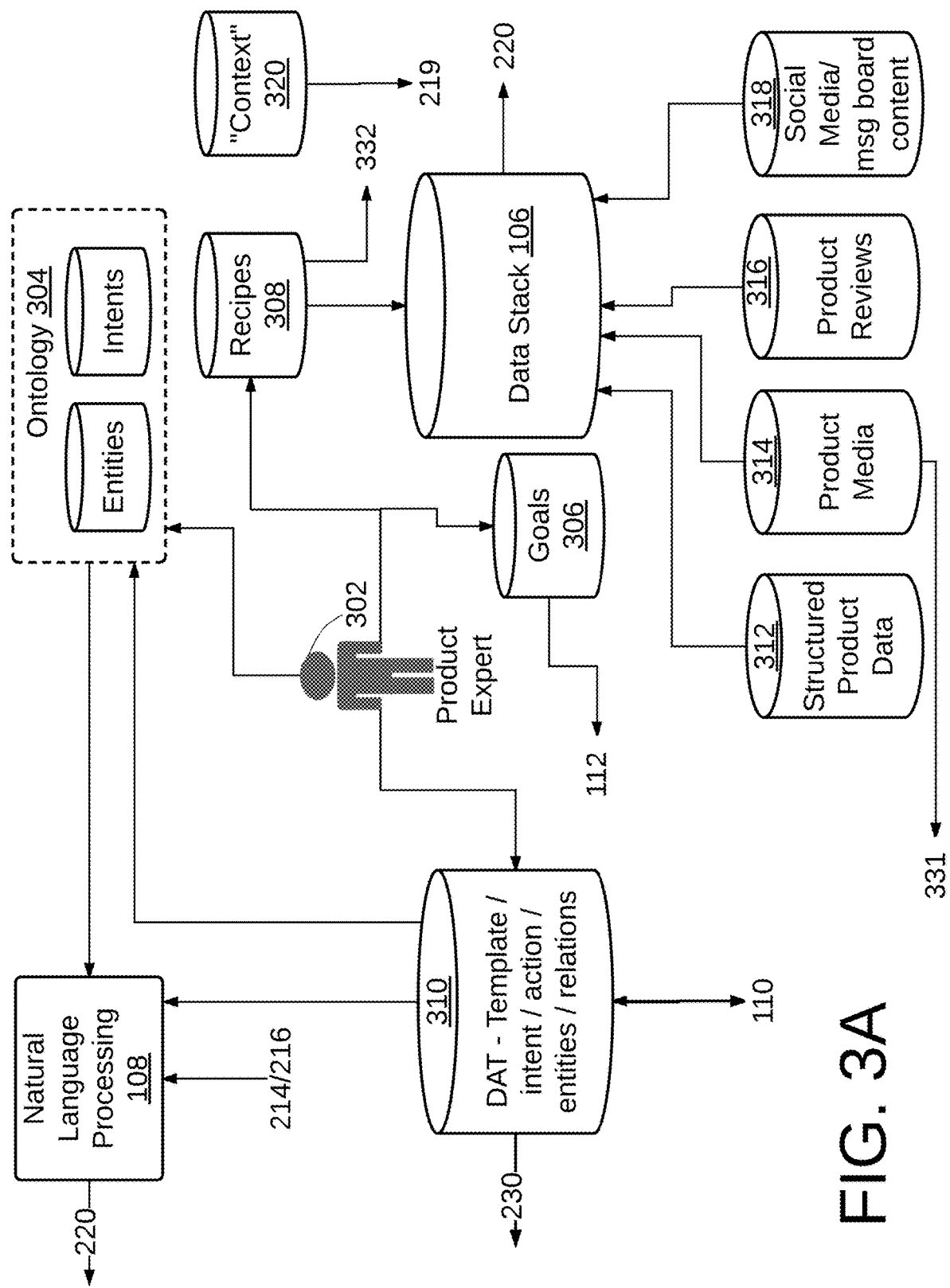
FIGS. 3A and 3B are block diagrams illustrating further details of the modules of FIG. 1.
Figure 3B:
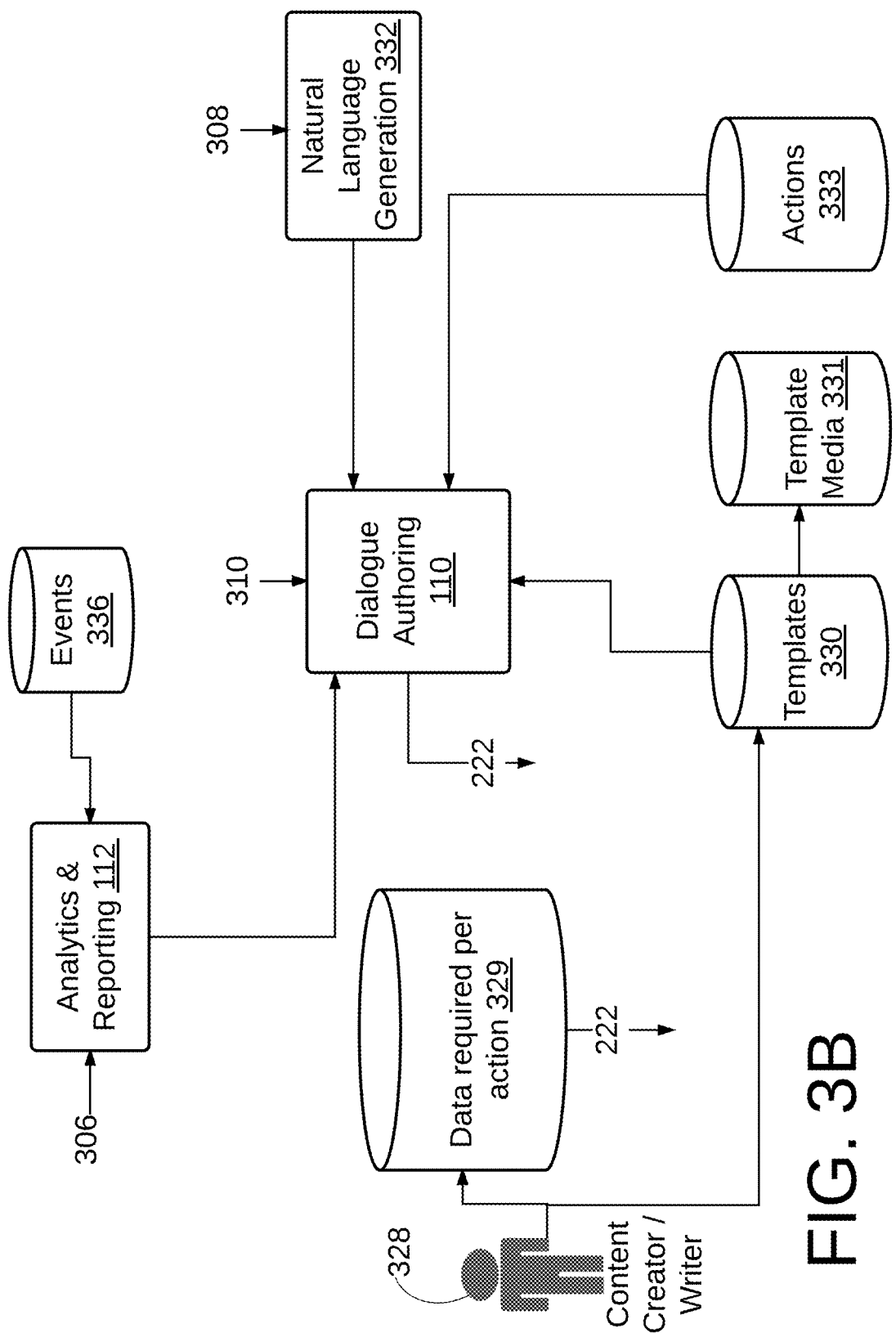

FIGS. 3A and 3B are block diagrams illustrating further details of the Data Stack 106, NLP module 108, Dialogue Authoring 110 and Analytics & Reporting 112 and their usage by Bot Core 104. A product expert 302 who is knowledgeable about a domain generates an ontology 304 which comprises entities and intents. As will be appreciated by those skilled in the art, an ontology is a formal naming and definition of the types, properties, and interrelationships of the entities that really exist in a particular domain of discourse. Product expert 302 also generates goals 306, recipes 308 and the combination of template/intent/action/entities/relations 310.

The system further provides imperative, effectful behavior. The system activates in response to certain input+state combinations, and the weight its response is given relative to the recipe/template system's response should vary based on the confidence of each system and the goals 306 and problem-domain. The disclosed systems and methods produce a currently-scarce, but valuable resource: domain-expert advisors. Their goals 306 are configurable, and can be to maximize value to the user. Product expert 302 creates goals 306 which are used indirectly via the analytics data to determine what templates to pull from.

Figure 5:
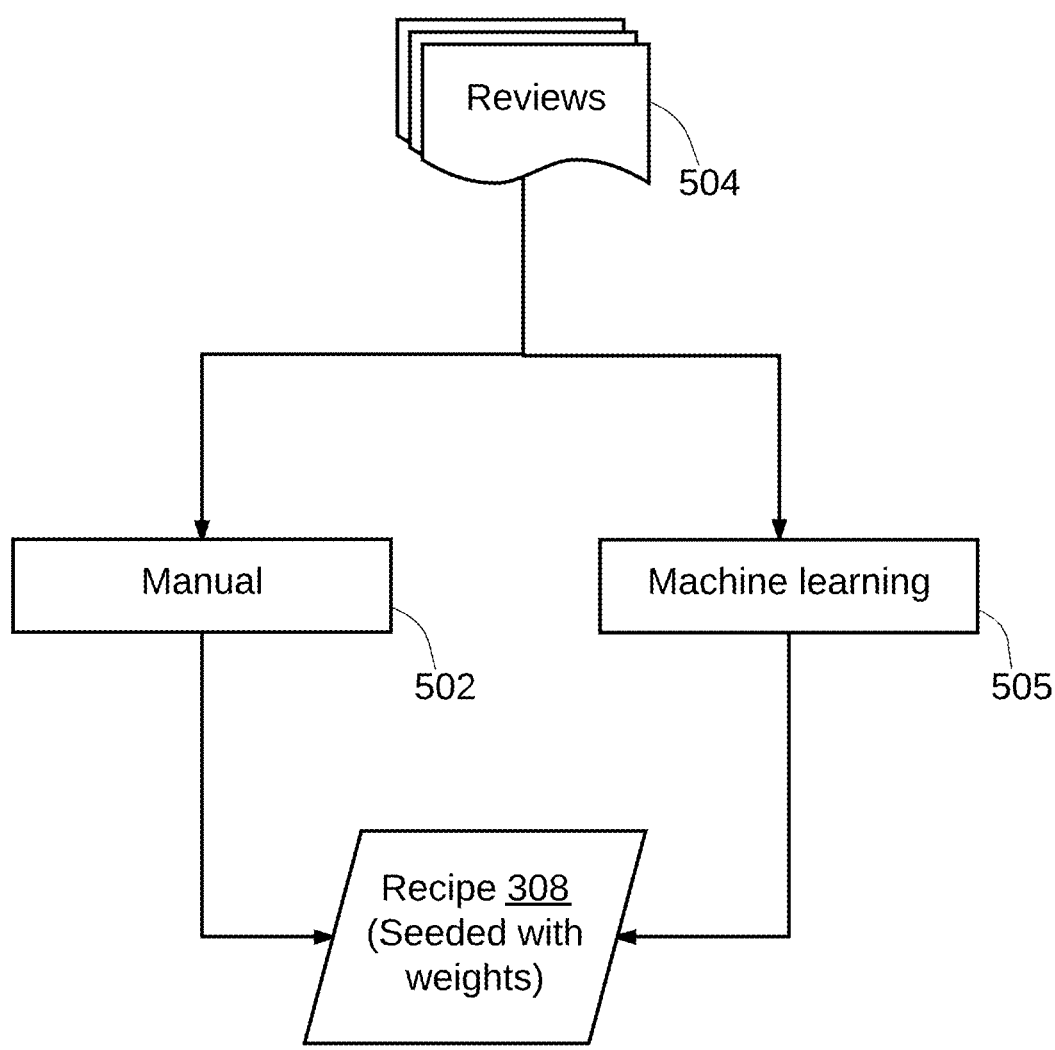
FIG. 5 is a flow diagram illustrating processing of reviews.

As shown in further detail in FIG. 5, recipes 308 are seeded with weights which are either manually created 502 by sub-domain experts, or extracted from expert reviews 504. For example, implementing this process for hotels, a large corpus of hotel reviews may be collected. A machine-learning algorithm 505 may extract that common topics include "cleanliness", "bed quality", "staff attentiveness" and others. Another algorithm may identify that positive sentiment about cleanliness is correlated with positive sentiment about staff attentiveness. (A human handler could input to the system that the correlation in this case is due to cleanliness being causatively related to staff attentiveness, establishing one as the parent node in the recipe tree). This process can be iterated to create arbitrary depth and breadth recipes, limited only by the atomic constituents of the problem space.

If the problem space is "deciding which college to attend", one recipe could be "fraternity/sorority engagement". It is conceivable that an atomic element of this problem space could be "availability of public transportation." However, the melting point of Cesium would not be an atomic element of this problem space.

Figure 6:
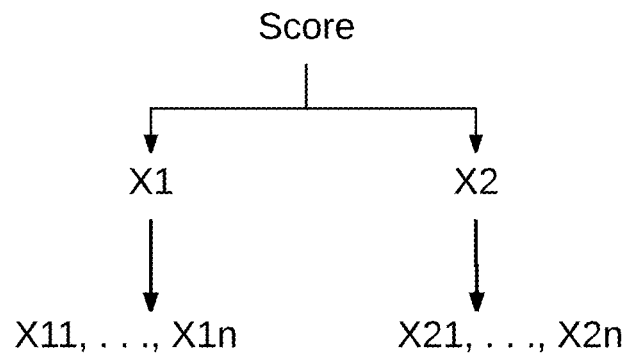
FIG. 6 is an illustration of an example tree structure.

The network or graph structure is used to justify/explain the decision arrived at by the system. Edges in the graph represent the connected nodes being related by numeric Normalized-Utility-Value-Assignment (normalized utility value assignment). An example tree structure is illustrated in FIG. 6. Overall Score has two children, $x\_1$ and $x\_2$. $x\_1$ has children $x\_{11}$ through $x\_1 n$, and $x\_2$ has children $x\_{21}$ through $x\_2 m$. Each node has a normalized utility value assignment function that inputs only that node's value and outputs a NUV. $x\_1$'s normalized utility value assignment function which is a weighted average of the NUV's of $x\_{11}$ through $x\_1 n$, as the Overall Score's normalized utility value assignment function is a weighted average of the NUVs of $x\_1$ and $x\_2$. In other words, the atomic values (in this case, x's with two-digit subscripts) are given a utility score. These utility scores bubble up through weighted averages all the way up to an overall score.

User preferences are preferably modeled to have the same "shape" of data as recipes, or a shape that is a strict subset of the shape of the recipe. The nodes are normalized utility value assignment functions which interact with the normalized utility value assignment functions of the corresponding recipe. For example, in the example above, user preferences could determine the weights in the weighted average that computes the Overall Score NUV from $x\_1$ and $x\_2$'s NUVs. This is a subset of the model of user preferences in which all normalized utility value assignment functions in a graph are determined by user preferences. A user preference model is generated empirically from interactions with users.

Turning back to FIG. 3A, the combination of template/intent/action/entities/relations 310 contains templates that each correlate to an Action, of which an intent has one or more. Actions are derived from intents based on values the entities assume for that intent. The intent, action, entities, and their values and relations are employed at step 230 to compile a template at 232. The intent and associated action and entities are defined by product expert 302. The template relations 310 also provides data for NLP module 108 and Ontology 110 (in that an Ontology is the name used by those practiced in the field to refer to entities and their relations to one another).

Data stack 106 comprises a variety of data types obtained from a variety of sources such as structured product data 312, product media 314, product reviews 316, and social media 318, including message board content. The data in data stack 106 is extracted from sources 312, 314, 316, 318, transformed, and loaded into data stack 106 in a manner described in more detail in FIG. 8.

Structured product data 312 may be obtained from a data supplier or an academic database. In the domain of cinema, an example is the IMDB Datasets. In automotive, some examples are Chrome and Jato Data. This data is relational and already structured for machine consumption. Product media 314 may be images, video, or audio. These can be part of the structured product data or from another source. If no official source for such media exists, it can be acquired by scraping Amazon, fan sites, and/or YouTube. Product reviews 316 may be those found in professional reviews (in the automotive domain, examples would be reviews from newspapers and magazines like Road & Track) can be tagged and surfaced in a fashion similar to a search engine. More uniquely, aspect-based sentiment analysis can be used to turn reviews into normalized utility functions to be used in recipes. Social media 318 may be content from Twitter, Reddit, and enthusiast sites or online shopping sites. This would be handled in the same way as product reviews 316. The difference would be in how they are presented to the user, as consumers assign different importances to expert reviews as compared to non-expert reviews. Vehicle specs can include data from JATO, Edmunds, Chrome, DataOne, AutoData. Empirical data can include road tests, surveys, cost studies, and reliability data. Subjective data may be expert reviews, user reviews and social media.

Context 320 provides data that provides contextual information regarding user 101 and includes demographic data regarding the user, such as age, location, sex, and other information that may have been entered by the user, along with dynamic information regarding the user such as may be obtained from user conservation with the system 100. Some examples: in the automotive domain, if the user has indicated that they currently own, and are happy with, a Honda, that would be stored for use in user preference computations; prior data may be analyzed and a classified using a machine learning algorithm, so that new users can be judged relative to that model, possibly on criteria such as "likelihood to produce positive net revenue"; an estimate of the user's expertise in the problem domain could affect the language generation algorithms.

Turning to FIG. 3B, an individual who serves as a content creator/writer 328 enters data required per action 329 and generates templates 330 which may employ template media 331, such as audio, video, images, as required. Natural language generation module 332 employs recipes 308 to produce meaningful explanations, that is, language can be generated that sounds convincingly human by leaning on the hierarchical structure of recipes and the accuracy of the utility functions, for example: "As far as safety is concerned, you want to think about Injury Prevention, Accident Avoidance, and Services. Both of the vehicles you are looking at perform similarly in most areas, but the Civic has more advanced Injury Prevention features. Would you like to hear more about Injury Prevention?" Actions 333 are subsets of intents, corresponding to the values in a user's state—this allows for crafting different dialogue templates in response to different situations—for example, if this were deployed in the automotive domain meant to promote a single manufacturer, the response templates for that manufacturer's vehicles should contain more positive language than the default template. Dialogue authoring module 110 provides a requested template in response to step 222. Data required per action, seen at 329 retrieves data required for each action. Analytics & Reporting module 112 employs goals 306 and data regarding events 336 to provide optimal template and deck variations for dialogue authoring module 110. For example, a goal may be the user expressing a certain intent—in the automotive domain, this intent could be the requesting of information regarding loans for a particular vehicle. This would be desirable as loan providers would pay for the opportunity to display their offerings at such a time. Since decks may contain different variations, over time, correlations can be discerned. This allows for dialogue variation to initially serve the purpose of humanizing the system, while over time discovering patterns that allow for modifying content to optimize for desired events—possibly events that result in payment. In certain embodiments, analytics dashboards provide information on traffic, dialogs, API queries and data usage. Furthermore, data visualizations and automated test scripts provide a quick sanity check for data values and vehicle scores.

In certain embodiments, Analytics & Reporting module 112 helps identify what consumers are really searching for in their next car purchase and the options they are interested in. This may be performed by analyzing the type of questions and concerns consumers have about purchasing a new car. Information may be collected from multiple external sources to create a consumer profile. These consumer profiles operate to improve car recommendation among various demographics.

FIGS. 4A and 4B illustrate various embodiments of templates. A template is a sequence of "decks", which contain "cards", the atomic elements of a chat UI (text card, image card, button card . . . ). A deck is a two-dimensional collection of cards. One dimension represents time (send this card, then this card, then this card . . . ). The other dimension represents variations. The simplest example as shown in FIG. 4A consists of one deck (one dimension seen at 402, with three variations of a one card response: "Hi! Hope you're having a good day!" (403), "yo" (404) and a response in a second language, in this case, Spanish, "Hola! Como estas" (405) to the Action="hello" template. In certain embodiments, there may be a 1/(Total number of variations) chance of getting each response. In other embodiments, this logic is configurable. Once the analytics system exposes the needed information, the system then picks a response based on its likelihood of achieving the desired outcome.

FIG. 4B illustrates a deck with two dimensions. As in FIG. 4A, dimension 402 represents variations in response. Dimension 406 represents time, or sequence in which responses are provided. As in FIG. 4A, three possible initial responses 403, 404, 405 are available. In addition, a followup set of responses 408 and 409 are available. Response 408 is a gallery response which contains an image in addition to text. Response 409, like responses 403-405 contains only a textual response.

As explained above, there are two methods of generating a response—from templates, and in encoded logic. In one embodiment, the encoded logic looks at recipes, and the templates do not. The templates may be managed in the Dialogue Authoring tool 110. In alternative embodiments, all language generation rules may be in the tool 110. In either case, the Data Stack 106 exists for the purpose of dialogue content, and as such is a useful, differentiating piece of the Dialogue Authoring tool.

The purpose of scoring is to capture and aggregate utility of all product attributes to support questions like: "Which hatchback under $20K is best overall?", or "Is the Fusion safer than the Accord?" This requires the following data: (i)

Scaling (min/max ranges, linearity/transfer function); (ii) Scores ranges (absolute vs. group-specific); (iii) Mapping features to utility ('value' of backup camera or leather seats vs. cloth); (iv) Logic (lack of rear air bags in 2-seater). The result of scoring is a score, where Score=[value, confidence, completeness], e.g. [7.9, 80%, 100%], Per attribute per trim (~500×~20,000).

The system supports a variety of functions. Similarity is a function that permits personalizable similarity metrics so consumers can browse product space by similarity. This operates by plotting cars in d-dimensional feature space and clustering them using k-means, as illustrated below.

| User | Consideration Set | Dimensions |
|---|---|---|
| OEM | Ridgeline ≈ Odyssey ≈ Pilot | Shared platform and drivetrain |
| EPA/DOT/NHTSA | Ridgeline ≈ Tacoma ≈ Colorado | Mid-size pickup |
| Consumer A | Ridgeline ≈ Wrangler ≈ 4Runner | "Rugged utility" |
| Consumer B | Ridgeline ≈ F150 ≈ Silverado | "Roomy cabin & light towing" |

Potential implementations of these models are map/reduce, weighted averages, or statistical or machine-learning models. A toy example: the case where the problem-domain is USB-powered fans. One dimension is total cost of ownership, which includes battery life and likelihood of failure. Both battery life and likelihood of failure have utility functions, which input these numeric attributes about a particular van, and output a Normalized Utility Scoreable, and eventually a value (a NU Value).

A Normalized Utility Scoreable is either a Normalized Utility Score, or a function (a NU Scorer) which inputs other attributes' Normalized Utility Scoreables. A NU Scorer resolves dependencies and outputs a NU Value (NUV). The method by which a NU Scorer resolves dependencies is an implementation detail. However, even in the event that the NU Scorer encounters circular dependencies, it is still resolvable to a NUV in a method similar to that described above.

Many systems can be used in parallel, for example extract entities and classify intent (or use other statistical/ML models), and match based on recipe-node tags in the template, or transform user input request for information to a statement and string match.

An example of a template in the car choosing problem space is below:

```
{tags:
  [ {
    label: HORSEPOWER,
    magnitude: 5,
    sentiment: {
        polarity: POSITIVE,
        magnitude: 0.85
    }
  }, {
    label: ENGINE_SIZE,
    magnitude: 5,
    sentiment: {
        polarity: POSITIVE
        magnitude: 0.86
    }
  }, {
    label: PERFORMANCE,
    magnitude: 5,
  }, {
    label: UTILITY,
    magnitude: 1,
  }],
  sentenceHuman: 'With a {{car.engine.niceName}} engine, and {{car.engine.horsepower}}, the {{car.name}} isn't lacking in {{descriptor (PERFORMANCE)}}.',
  matchSentences: ['the {{car.name}} has {{car.engine.horsepower}}',
  'the {{car.name}} ha a {{car.engine.niceName}}', 'the {{car.name}} has a lot of power'
Copyright 2016 CarLabs Inc.
```

In the above example, UTILITY shows up because it is weakly tied to HORSEPOWER. That is, horsepower is a problem-domain-element-part, so it has a corresponding recipe-node. That recipe node is connected to the parent node of utility and performance recipes, by one or more edges. Travelling along those edges is isomorphic to applying the normalized utility value assignment function connecting the horsepower node to the utility and performance nodes, respectively. In this implementation, the NUR contains 1 and 5. It is conceivable that horsepower could connect to safety as well, and that normalized utility value assignment function could output a negative number for some values of horsepower (horsepower adds to safety as it makes merging safer, until it crosses a threshold and becomes correlated with risk).

The User model may also contain a section for storing functions other than normalized utility value assignment functions. There can be a class of binary functions which act on problem-domain-element-parts without an associated recipe-node, and output a Boolean value, which indicates whether this problem-domain-element is within the user's consideration set.

Templates need not only contain output text. The output could contain information (structured data or markup strings) which triggers the generation of, or represent, (hyper)media. Graphs which explain relationships, between problem-domain-element-parts and recipe-nodes, for example. If problem-domain-elements(-parts) physically exist, images or videos could be output. Links to more information are another example of hypermedia template output. The hypermedia component is not a necessary component, though it helps further the goals of the process.

In addition to output and input, the system suggests follow up questions for the user to ask. Moreover, the detailed user model can generate suggested replies with more nuance than available systems. Suggested input can be driven by previous user interaction (a bias towards clustering users) or can be built to push the user towards certain conclusions or actions (explicit bias). For example, a life-advice bot can be given priors which implicitly favor certain viewpoints, and this can be reinforced with suggested user inputs.

In addition to the user model, the conversation input and output are stored, as are values derived from it. Together with a model generated by previous user sessions, these three things (user model, conversation model, other sessions model) constitute the "context" of the conversation. Any process described herein has access to the context and can modify its behavior in response to it. The effect of context on a process or series of processes can be hard-coded or learned via a supervised learning algorithm. This level of depth in the modeling of context is a novel feature.

Figure 8:
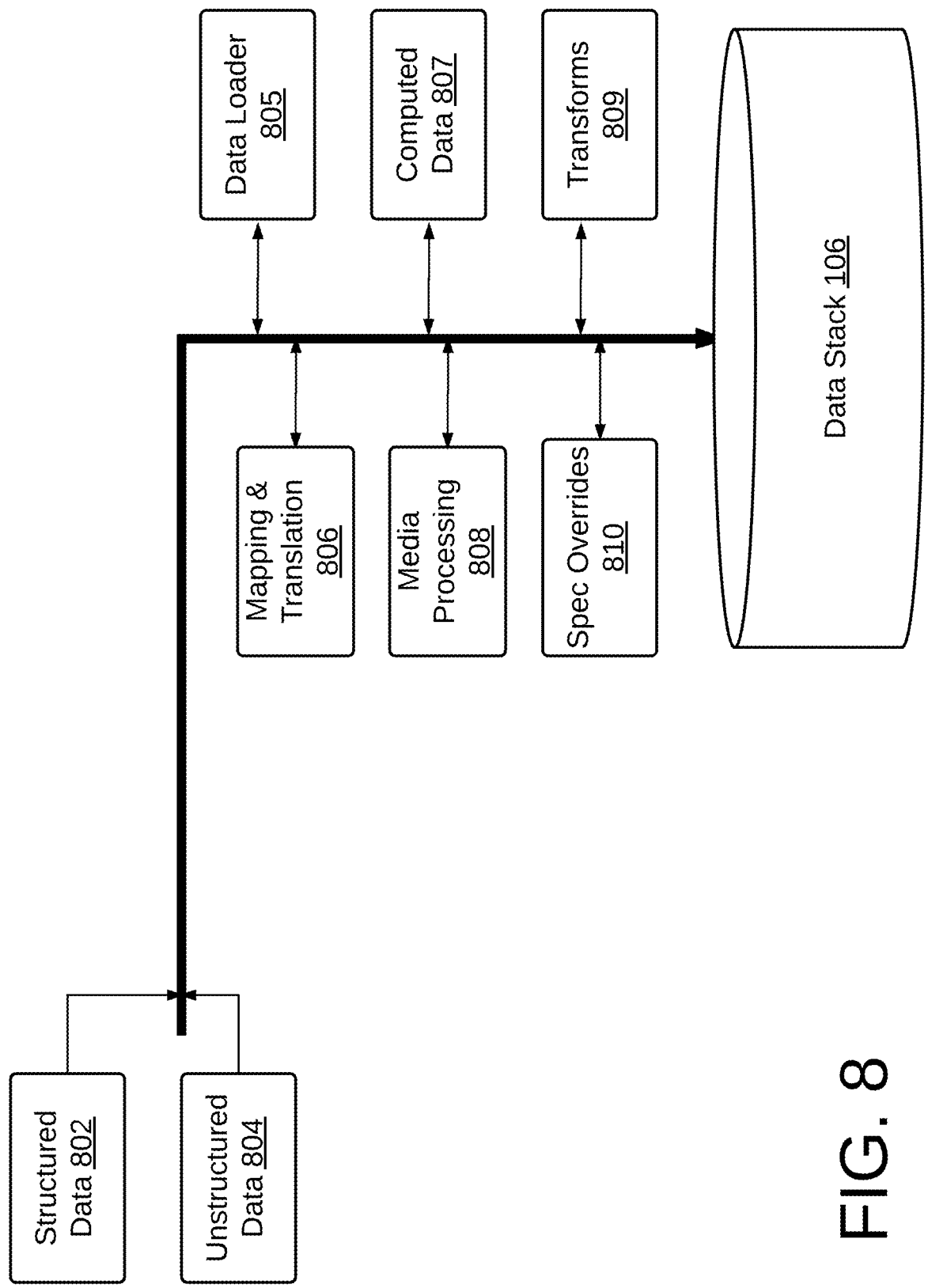
FIG. 8 is a block diagram illustrating data loading into the Data Stack 106.

FIG. 8 is a block diagram illustrating data loading into the Data Stack 106. The Data Pipeline 800 ingests all data and transforms this data into a normalized and consistent internal representation. The system advantageously receives both structured data 802 and unstructured data 804. Modules 805-810 perform various specific processing on the received data before it is stored in Data Stack 106. Data Loader 805 imports data from its native form and performs various transformations that may be necessary. Mapping & Translation module 806 transforms all external data 802, 804 into an internal representation and decouples from any source data. Computed Data module 807 generates data values computed from imported data. For example, in the automobile domain, if a zero to sixty acceleration time is not available, a value representative of that value may be computed from underlying imported data that specifies horsepower, drive type, weight and transmission type. Media Processing module 808 performs various transformation on media data such as resizing images, and allowing editing of video by manual or machine implemented techniques. Transforms module 809 performs transformations on data that may be required for usage by the system. Spec Overrides module 810 permits overrides to be specified for any particular data. In certain embodiments, the data may be stored in a manner so as to be accessible via the GraphQL query language available from Facebook. As will be appreciated by those skilled in the art, such a query language provides the capability to provide an application with the types of queries permitted by the stored data. A typical workflow in processing the data in the Data Stack 106 involves randomly splitting a dataset of interest into training/test sets, regressing variables to the predictors, and checking with cross-validation to ensure fit.

In certain embodiments, Data Stack 106 may employ machine learning for: (i) Inter/extra-polating missing vehicle specifications such as MPG, CO2 emissions, curb weight, acceleration, etc.; (ii) Measuring and predicting subjective attributes of vehicles such as comfort, 'sexiness' of the car, 'valet envy', etc.; and (iii) Assessing consumer and expert sentiment on different vehicle aspects such as handling, appeal or customer satisfaction. In some cases, data that may be required for a recipe may not be available via external sources. For example, for automobiles, miles per gallon (MPG) is a common missing data point that is needed in providing an economy score for a vehicle. The system 100 enables modeling of MPG as a function of known attributes of a car such as curb weight, horsepower, driven wheels (AWD,FWD,RWD), etc., where for example: mpg~driven wheel+curb weight+ . . . +horsepower. In some embodiments, this may be performed by the following steps: (i) check to see which predictors are missing for MPG(city, highway,combined); (ii) if missing impute those values, for example, curb weight is imputed with the average weight for that body type and body size; (iii) randomly split the dataset into training/test sets; regress MPG to the predictors and check with cross-validation to make sure of good fit; (iv) deploy model for use in production to fill in missing data.

Another example is computing Total Cost of Ownership (TCO) for a vehicle, which is a value that may not be available or available information may not fully reflect all of the costs inherent in owning a vehicle. There are several costs in owning and maintaining a vehicle such as fuel cost, registration, maintenance, and taxes. For example, for fuel costs, the variability of gas prices from state to state using data collected from external sources may be captured. Insurance estimates for new cars may also be employed. For example, a young, 20 year old may not know that his insurance for his desired sports car will be really expensive. This permits the system to provide the best estimate of TCO to provide a clearer picture of the financial commitment for car buyers.

FIGS. 9 and 10 are screen shots showing a user interface for interacting with the system to create recipes. In FIG. 9, a recipe for "Comfort" 900 in a vehicle includes five primary nodes, 901—General, 902—Interior Space, 903—Seating, 904—Steering Wheel, 905—Air Conditioning. Each of these primary nodes represents a characteristic of comfort within a vehicle and each primary node has associated therewith several sub-characteristics that further define the more general characteristic set forth by the primary node as it pertains to the characteristic defined by the recipe. For example, the primary node 901—General has associated therewith three sub-characteristics, one-touch power, Cup Holder location, and Power. The primary node 902—Interior Space has associated therewith four sub-nodes or sub-characteristics that further define the characteristic "Interior Space" as it pertains to comfort within a vehicle. For example, aspects of interior space include front headroom (Front Head), front legroom (Front Leg), front shoulder room (Front Shoulder), rear headroom (Rear Head), and rear legroom (Rear Leg). Sub-characteristics for primary nodes 903, 904, 905 can also be seen in FIG. 9.

Node selection and editing can be performed in the center portion of the screen as seen at 910. Existing recipes can be searched for or selected from a list at 911. A recipe can be named or re-named at 912. Primary or sub-nodes can be assigned a weight at 913 to signify relative importance with respect to other nodes. For example, node 903—Seating may be assigned a higher importance than node 904—Steering Wheel to signify that the characteristics of seating are more important to comfort in a vehicle than the characteristics of the steering wheel. The order in which the nodes or sub-nodes are listed can be specified at 914. Limits for numerical values associated with a node can be specified at 915 (minimum value) and 916 (maximum value). For example, in a node specifying horsepower, minimum and maximum values for horsepower may be specified. For nodes that specify characteristics that can be quantified, at 917 an entry can be made if more of the quantity is better. For example, node 905—Air Conditioning has associated therewith a sub-node for Front Zones. If the recipe creator wishes to specify that more front zones for air conditioning increase comfort then that can be specified at 917. A node or sub-node can also be specified as an Explainer node, which would provide an explanation of an aspect to a user.

FIG. 10 illustrates a recipe for Safety 930 which includes six primary nodes: 931—Safety Sensors, 932—Airbag Count, 933—Environment Modifiers, 934—Mechanical, 935—Brakes and 936—Crash Ratings. Editing/creation portion 910 (the same as shown as in FIG. 9) permits creation and naming of a new node and retrieval, editing and re-naming of existing nodes.

In certain embodiments, the system 100 can generate additional characteristics from data stored in the Data Stack 106. For example, taking the dimensions of the consumer's height and weight to predict how comfortable they will be in a car. This may be performed by, given the person body size and dimensions with the max and min adjustments of the seat, predicting the chance a particular vehicle will be a good fit for a given person. The current car of the individual is used as a baseline. The user is asked about the fit of the current car and this is used as a baseline to determine the likely fit of a particular new car. In other embodiments, the system can estimate if their new car will fit in their garage. This may be performed by using dimensions of their current car and how well it fits and see if it has similar dimensions.

For a new home, the car owner can take a picture, with a reference object, such as a dollar bill to estimate the garage size.

Figure 11:
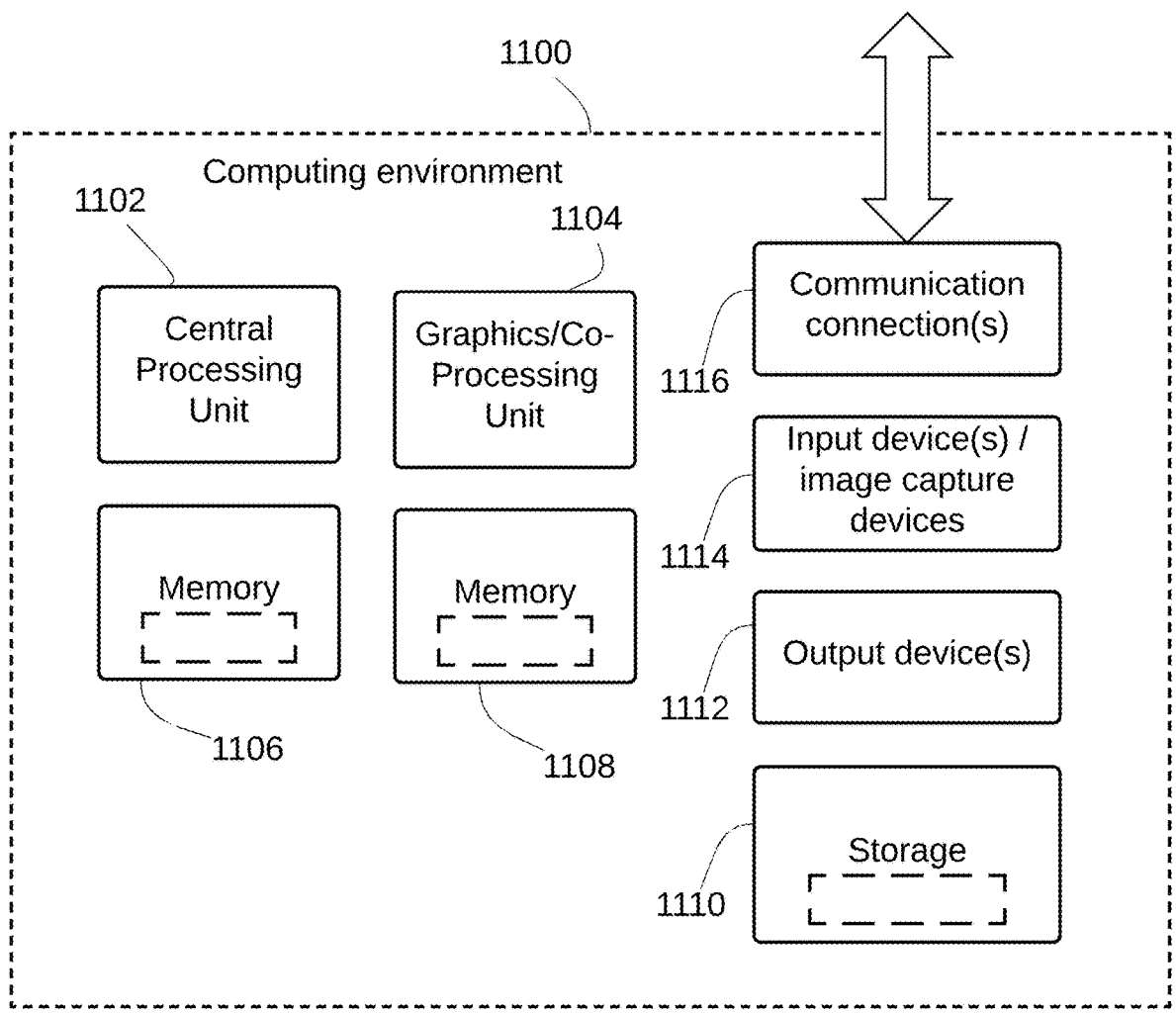
FIG. 11 illustrates a block diagram of hardware that may be employed in an implementation of the system 100.

FIG. 11 depicts a generalized example of a suitable general-purpose computing system 1100 in which the described innovations may be implemented in order to improve the processing speed and efficiency with which the computing system 1100 operates to perform the functions disclosed herein. With reference to FIG. 11 the computing system 1100 includes one or more processing units 1102, 1104 and memory 1106, 1108. The processing units 1102, 1106 execute computer-executable instructions. A processing unit can be a general-purpose central processing unit (CPU), processor in an application-specific integrated circuit (ASIC) or any other type of processor. The tangible memory 1106, 1108 may be volatile memory (e.g., registers, cache, RAM), non-volatile memory (e.g., ROM, EEPROM, flash memory, etc.), or some combination of the two, accessible by the processing unit(s). The hardware components in FIG. 11 may be standard hardware components, or alternatively, some embodiments may employ specialized hardware components to further increase the operating efficiency and speed with which the system 100 operates.

Computing system 1100 may have additional features such as for example, storage 1110, one or more input devices 1114, one or more output devices 1112, and one or more communication connections 1116. An interconnection mechanism (not shown) such as a bus, controller, or network interconnects the components of the computing system 1100. Typically, operating system software (not shown) provides an operating system for other software executing in the computing system 1100, and coordinates activities of the components of the computing system 1100.

The tangible storage 1110 may be removable or non-removable, and includes magnetic disks, magnetic tapes or cassettes, CD-ROMs, DVDs, or any other medium which can be used to store information in a non-transitory way and which can be accessed within the computing system 1100. The storage 1110 stores instructions for the software implementing one or more innovations described herein.

The input device(s) 1114 may be a touch input device such as a keyboard, mouse, pen, or trackball, a voice input device, a scanning device, or another device that provides input to the computing system 1100. For video encoding, the input device(s) 1114 may be a camera, video card, TV tuner card, or similar device that accepts video input in analog or digital form, or a CD-ROM or CD-RW that reads video samples into the computing system 1100. The output device(s) 1112 may be a display, printer, speaker, CD-writer, or another device that provides output from the computing system 1100.

The communication connection(s) 1116 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer system that permits flexible, natural conversational type interactions comprising:
    data storage that stores a data stack comprising a database with configurable comparison and evaluation logic for importing, transforming, normalizing, and exporting data pertaining to a domain;
    a processor programmed with instructions that when executed cause the processor to perform,
    natural language processing by receiving natural conversational type interactions from a user and generating structured data from unstructured inputs regarding user queries within the domain;
    dialogue authoring by permitting creation of complex dialogues, comprising recipes that characterize aspects of a product within the domain wherein each recipe takes the form of a model with one or more nodes, interconnected in a hierarchical tree structure, with each node representing a numeric utility value to of an atomic constituent part of an element of the domain and wherein the recipe accumulates the numeric utility values to a single top-level score indicating desirability of a measurable attribute of the product, wherein the product has associated therewith data stored in the data storage that is indicative of a plurality of measurable attributes of the product;
    core operations by receiving the structured data created by the natural language processing and causing output to the user in the form of natural language type responses by way of one or more selected templates, wherein each of the selected templates template is tagged as being connected to at least one node in a recipe, the core operations further comparing the single top-level score indicating desirability of a measurable attribute of the product with one or more other top-level scores corresponding to other products in the domain to provide a comparison to the user; and
    analytics and reporting that analyzes usage comprising the natural conversational type interactions by the user of the computer system to modify one or more of the complex dialogues.

2. The computer system of claim 1 wherein data in the data stack comprises one or more data types including one or more of structured product data, product media, product reviews and social media wherein the data is extracted from a plurality of source, transformed and loaded into the data stack.

3. The computer system of claim 2 wherein the processor is further programmed with instructions that when executed cause the processor to perform computing to generate, data values computed from imported data.

4. The computer system of claim 3 wherein the processor is further programmed with instructions that when executed cause the processor to perform computing to perform transformations on imported media data.

5. The computer system of claim 4 wherein the data stack employs a machine learning engine to interpolate and extrapolate data missing in certain of the imported data.

6. The computer system of claim 4 wherein the data stack employs a machine learning engine to measure and predict subjective attributes of certain imported data.

7. The computer system of claim 6 wherein the core operations operate to:
   if a received user inputted query does not match a template then
      prompting the user to enter additional specified information related to the user inputted query, and
      employing additional specified information received from the user to search for a matching template.

8. A non-transitory storage medium, having stored thereupon one or more program modules comprising computer-executable instructions for execution on a computer system, the computer-executable instructions causing the computer system to provide flexible, natural conversational type interactions with a user, the computer-executable instructions implementing:
   natural language processing for receiving natural conversational type interactions from a user and generating structured data from unstructured inputs regarding user queries within a domain;
   a data stack comprising a database with configurable comparison and evaluation logic for importing, transforming, normalizing, and exporting data pertaining to the domain;
   dialogue authoring by permitting creation of complex dialogues, comprising recipes that characterize aspects of a product within the domain wherein each recipe takes the form of a model with one or more nodes, interconnected in a hierarchical tree structure, with each node representing a numeric utility value to of an atomic constituent part of an element of the domain and wherein the recipe accumulates the numeric utility values to a single top-level score indicating desirability of a measurable attribute of the product, wherein the product has associated therewith data stored in the data storage that is indicative of a plurality of measurable attributes of the product;
   core operations that receive the structured data created by the natural language processing and cause output to the user in the form of natural language type responses by way of one or more selected templates, wherein each of the selected templates template is tagged as being connected to at least one node in a recipe, the core operations further comparing the single top-level score indicating desirability of a measurable attribute of the product with one or more other top-level scores corresponding to other products in the domain to provide a comparison to the user; and
   analytics and reporting by analyzing usage comprising the natural conversational type interactions by the user of the computer system to modify one or more of the complex dialogues.

9. The non-transitory storage medium of claim 8 wherein data in the data stack comprises one or more data types including one or more of structured product data, product media, product reviews and social media wherein the data is extracted from a plurality of source, transformed and loaded into the data stack.

10. The non-transitory storage medium of claim 9 wherein the computer-executable instructions further implement media processing that performs transformations on imported media data.

11. The non-transitory storage medium of claim 10 wherein the data stack employs a machine learning engine to interpolate and extrapolate data missing in certain of the imported data.

12. The non-transitory storage medium of claim 11, wherein the core operations operate to:
   if a received user inputted query does not match a template then
      prompting the user to enter additional specified information related to the user inputted query, and
      employing additional specified information received from the user to search for a matching template.

13. The computer system of claim 1 wherein the top-level score of the recipe is indicative of desirability of a measurable attribute of the product.

14. The computer system of claim 1 wherein the core operations tag each template as being connected to at least one node in a recipe, each tag associated with match of a template to a feature, wherein each tag is characterized by a magnitude that represents strength of a connection between the match of a template to a feature and all other features within the template.

15. The computer system of claim 7 wherein the core operations:
   tag each template as being connected to at least one node in a recipe, each tag associated with match of a template to a feature, wherein each tag is characterized by a magnitude that represents strength of a connection between the match of a template to a feature and all other features within the template; and
   supply values missing in a matching template by,
      identifying and retrieving recipes related to the user query;
      identifying relevant features in the recipes related to the user query;
      ordering the relevant features by the magnitude by decreasing magnitude;
      selecting a predetermined number of the relevant features in the ordering having highest magnitude; and
      using the relevant features in the ordering having highest magnitude to supply values missing in the matching recipe.

16. A computerized method for interacting with a user by way of flexible, natural conversational type interactions, comprising:
   creating a plurality of recipes each of which comprises one or more features organized as one or more nodes interconnected in a hierarchical tree structure, with each node representing a numeric utility value corresponding to each feature, wherein each numeric utility value is indicative of desirability of the corresponding feature within the domain;
   for each recipe of the plurality of recipes, accumulating numeric utility values at each node to generate a single top-level score indicating desirability of a measurable attribute of the product, wherein the product has associated therewith data stored in the data storage that is indicative of a plurality of measurable attributes of the product;

adjusting one or more sets of user specified preferences to match predetermined characteristics of corresponding recipes;

generating one or more templates, each template specifying a format for providing an output for a user request for information, wherein each template corresponds to one or more features in one or more recipes;

receiving user inputted queries and matching the queries to the templates;

adjusting a correlation indicator indicative of a correlation between tagged attributes in two or more of the templates in response to user preferences contained in the user inputted queries; and outputting to the user information regarding the specified domain as answers to the user inputted queries, as specified in a matched template by comparing the single top-level score indicating desirability of a measurable attribute of the product with one or more other top-level scores corresponding to other products in the domain to provide a comparison to the user.

17. The computer system of claim 1, wherein the recipe accumulates at each node, a weighted average of numeric utility values of all sub-nodes in the hierarchical tree structure.

18. A computer system that permits flexible, natural conversational type interactions comprising:

data storage that stores a plurality of recipes and templates; and a processor programmed with instructions that when executed cause the processor to:

create a plurality of the recipes each of which comprises one or more features organized as one or more nodes interconnected in a hierarchical tree structure, with each node representing a numeric utility value corresponding to each feature, wherein each numeric utility value is indicative of desirability of the corresponding feature within the domain;

for each recipe of the plurality of recipes, accumulating numeric utility values at each node to generate a single top-level score indicating desirability of a measurable attribute of the product, wherein the product has associated therewith data stored in the data storage that is indicative of a plurality of measurable attributes of the product;

adjust one or more sets of user specified preferences to match predetermined characteristics of corresponding recipes;

generate one or more of the templates, each template specifying a format for providing an output for a user request for information, wherein each template corresponds to one or more features in one or more recipes;

receive user inputted queries and matching the queries to the templates;

adjust a correlation indicator indicative of a correlation between tagged attributes in two or more of the templates in response to user preferences contained in the user inputted queries; and output to the user information regarding the specified domain as answers to the user inputted queries, as specified in a matched template by comparing the single top-level score indicating desirability of a measurable attribute of the product with one or more other top-level scores corresponding to other products in the domain to provide a comparison to the user.

19. The computer system of claim 18 wherein the processor is further programmed with instructions that cause the processor to:

if a received user inputted query does not match a template then prompt the user to enter additional specified information related to the user inputted query, and employ additional specified information received from the user to search for a matching template.

\* \* \* \* \*